May 4, 1926.  
C. E. COLEMAN  
BRAKE  
Filed Dec. 1, 1924  
1,583,529

Inventor  
Clyde E. Coleman  
By Thos. Donnelly  
Attorney

Patented May 4, 1926.

1,583,529

UNITED STATES PATENT OFFICE.

CLYDE E. COLEMAN, OF DETROIT, MICHIGAN.

BRAKE.

Application filed December 1, 1924. Serial No. 753,091.

*To all whom it may concern:*

Be it known that I, CLYDE E. COLEMAN, a citizen of the United States, residing at Detroit, in the county of Wayne and State of Michigan, have invented a new and useful Improvement in a Brake, of which the following is a specification.

My invention relates to a new and useful improvement in a brake, adapted for mounting on a vehicle and for engaging the surface over which the vehicle is being propelled, for the purpose of retarding the forward movement of the vehicle, or preventing lateral swing or skidding of the vehicle. It is an object of the invention to provide a brake of this class, which will have a rockable shoe adapted for contact with the surface over which the vehicle is being propelled.

It is another object of this invention to provide a gripping plate which is detachable, mounted on the shoe. Another object of the invention is the provision of an engagement shoe having the sides and ends thereof, curved upwardly, to provide a surface adapted for riding over large obstructions, so as to relieve the shoe and its mountings from unusual strain.

Other objects will appear hereinafter.

The invention consists in the combination and arrangement of parts hereinafter described and claimed. The invention will be best understood by a reference to the accompanying drawings, which form a part of this specification, and in which:

The invention is adapted for use with vehicles of various types, but is particularly useful with motor driven vehicles which are accustomed to attain a high rate of speed. When it is desired to bring these vehicles to a stop from a high rate of speed, it is often experienced that the brakes of the vehicle, while functioning properly, and resisting the rotation of the wheels of the vehicle, do not serve to retard the forward movement of the vehicle, as the tires do not grip the surface over which they are passing, sufficiently tight to give the necessary friction to retard the movement of the vehicle. The present invention will serve as an additional surface engaging body and by providing the engaging surface with sharpened or pointed engaging members, considerable resistance is developed for preventing the forward movement of the vehicle. Owing to this engaging member contacting with the surface over which the vehicle is being propelled, a lateral swinging or skidding of the vehicle may also be checked.

Figure 1:
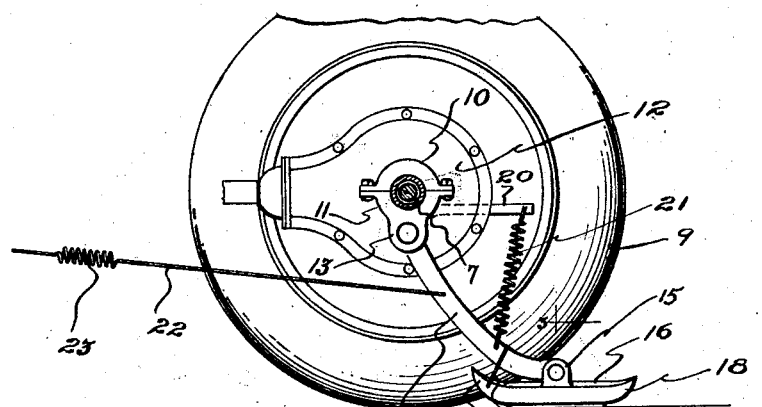
Fig. 1 is a side elevational view of the invention, mounted on a vehicle axle.
Figure 2:
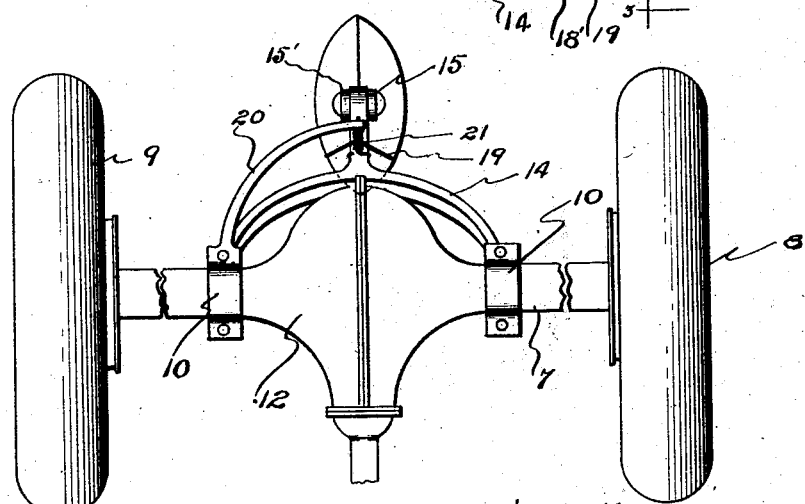
Fig. 2 is a top plan view, showing the invention mounted on a rear axle.
Figure 3:
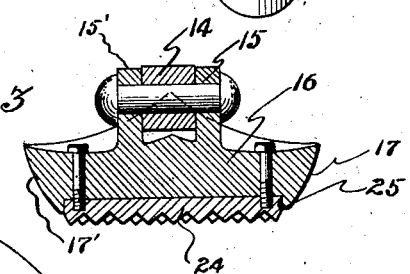
Fig. 3 is a sectional view taken through line 3—3 of Fig. 1.
Figure 4:
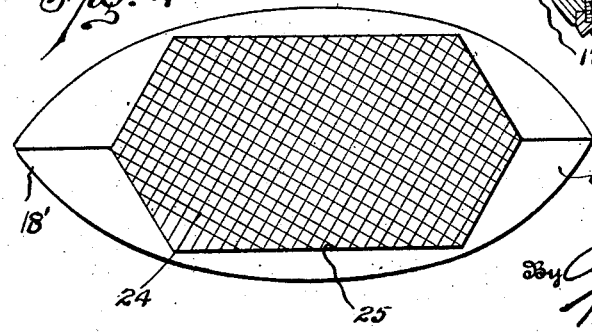
Fig. 4 is a bottom plan view of the shoe used in the invention.

The invention is preferably attached to the rear axle 7 of the vehicle upon which the wheels 8 and 9 are mounted, although the device may also be mounted on the chassis or other suitable structure of the vehicle, as desired. In the mountings, as I have shown them, I have provided a pair of clamping members 10 and 11, which are adapted for embracing the axle 7 in clamping relation, suitable bolts being provided to effect the clamping engagement. A pair of these clamping members are mounted preferably at opposite sides of the differential box 12. Projecting downwardly from each of the members 11, is a lug 13, in which is pivotally mounted a curved arm 14 of a yoke, the tree of which is pivotally mounted at its end between a pair of lugs 15 and 15′, which project upwardly from a shoe 16. As shown in Fig. 3, the side walls 17 and 17′ of this shoe are curved upwardly and outwardly from the base. The ends 18 and 18′ are similarly curved. The shoe 16 is, on account of its mountings with the arm 14, rockable relatively to the arm, so that as the shoe, passing over the surface with which it engages, strikes an obstruction unusually large, the shoe may easily rock to permit its passage over the obstruction. When the end 18′ rocks upwardly to sufficient distance, it will engage the lower edge of the arm 14 and its upwardly rocking movement is thus limited. Secured to the forward end 18′ of the shoe 16 and projected over the arm 14 is a wire loop 19 which will prevent any undue inward rocking of the rear end 18 of the shoe 16. As shown in Fig. 1, the loop 19 is such as to prevent a rocking of the rear end 18 of the shoe upwardly beyond the horizontal. This is as it should be, as an upward rocking of the end 18′ is all that is desired to permit the passage, under the shoe 16, of an unusually large obstruction, the obstruction carrying the shoe bodily upward, when being passed over by the shoe.

Projecting rearwardly from one of the members 10, is an arm 20, connected to the free end of which, at one end, is a spring 21, the opposite end of which is connected with the arm 14. This spring 21 tends to normally maintain the shoe 16 in elevated position, so that it will not contact with the surface over which the vehicle is being propelled. Attached to the arm 14 and projecting forwardly therefrom, to a position readily accessible to the operator of the vehicle is a cable or rod 22, in which is positioned a spring 23. A forward pulling of the rod or cable 22 will serve to swing the arm 14 downwardly against the tension of the spring 21 so as to bring the engaging surface of the shoe 16 into contact with the surface over which the vehicle is being propelled. This engaging surface of the shoe 16, comprises a plate 24, which is mounted in a recess 25, formed in the bottom of the shoe 16, by suitable bolts and provided on its under surface with corrugations, teeth or other projections which will serve to afford a means for tightly gripping the surface over which the vehicle is being propelled. The face of this plate 24 may vary in pattern, and the projections formed on its outer face may vary. These variations, however, are contemplated, and considered within the field of the present invention, such variations and modifications being such as would appeal to the ordinary mechanic skilled in the art.

When the plate 24 is brought into engagement with the surface, the friction of this plate with the surface passed over, will tend to retard the forward movement of the vehicle, thus serving as an effective brake against forward movement and assisting the usual brakes of the vehicle in checking the speed or movement of the vehicle.

An engagement of the shoe 16 with the surface passed over by the vehicle will also serve to prevent any skidding or side swinging, of the vehicle, it being possible for the user of the vehicle to quickly and easily bring the shoe into engagement with the surface passed over in any emergency, upon a forward pull upon the rod or cable 22.

While I have illustrated and described the preferred form of structure, I do not wish to limit myself to the precise details shown, but desire to avail myself of such variations and modifications as come within the scope of the appended claim.

Having thus described my invention, what I claim as new and desire to secure by Letters Patent, is:

A brake of the class described, comprising a pair of supporting members, adapted for mounting on the axle of a vehicle with which used; an arcuate arm projecting rearwardly from one of said supporting members; a yoke, pivotally connected at the end of each of its arms to said supporting members, the tree of said yoke being arcuate adjacent its free end; a shoe rockingly mounted on the free end of said tree having the ends curved upwardly and the upper surface thereof formed arcuate to correspond substantially to the curvature of the free end of said tree, said tree being adapted for engaging one end of said shoe, throughout substantially one-half the length of said shoe upon the rocking of said shoe a predetermined distance in one direction, for limiting the rocking of said shoe in said direction; and resilient means connected to said arcuate arm and to said tree, for normally retaining said shoe in inoperate position.

In testimony whereof, I have signed the foregoing specification.

CLYDE E. COLEMAN.